United States Patent
O'Donnell (10) Patent No.: US 9,961,069 B2
(45) Date of Patent: May 1, 2018

(54) TICKET GENERATOR FOR ALTERNATE AUTHENTICATION ENVIRONMENTS

(71) Applicant: CA, Inc., New York, NY (US)

(72) Inventor: Joseph Lawrence O'Donnell, Melrose, MA (US)

(73) Assignee: CA, Inc., New York, NY (US)

(*) Notice: Subject to any disclaimer, the term of this patent is extended or adjusted under 35 U.S.C. 154(b) by 34 days.

(21) Appl. No.: 14/806,485

(22) Filed: Jul. 22, 2015

(65) Prior Publication Data

US 2017/0026362 A1 Jan. 26, 2017

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC ...... *H04L 63/0815* (2013.01); *H04L 63/0807* (2013.01)

(58) Field of Classification Search
CPC ... H04L 63/0815; H04L 63/08; H04L 63/083; H04L 67/02; G06F 21/41
USPC .......................................................... 726/8
See application file for complete search history.

(56) References Cited

U.S. PATENT DOCUMENTS

| | | | |
|---|---|---|---|
| 2003/0188193 A1 | 10/2003 | Venkataramappa | |
| 2012/0291112 A1* | 11/2012 | Sivaramakrishna Iyer | H04L 12/24 726/7 |
| 2013/0340054 A1* | 12/2013 | Subramanya | G06F 21/33 726/5 |
| 2014/0032691 A1* | 1/2014 | Barton | H04L 41/00 709/206 |
| 2014/0032733 A1* | 1/2014 | Barton | H04L 41/00 709/223 |
| 2014/0032758 A1* | 1/2014 | Barton | H04L 41/00 709/225 |

(Continued)

OTHER PUBLICATIONS

SAP, Inc., "Single Sign-On With Logon Tickets", https://help.sap.com/saphelp_nw70ehp2/helpdata/en/89/6eb8e1af2f11d5993700508b6b8b11/frameset.htm, as visited on Apr. 21, 2015, 2 pages.

(Continued)

*Primary Examiner* — Kambiz Zand
*Assistant Examiner* — Stephen Sanders
(74) *Attorney, Agent, or Firm* — Gilliam IP PLLC (57) ABSTRACT

In a computer system, some resources may be protected within an SSO environment, and other resources may be protected in an alternate authentication environment. A user logged into an alternate authentication environment will again be prompted for login credentials when accessing an SSO protected resource. To avoid additional login prompts, credentials authenticated by the alternate authentication environment are used by the SSO environment to identify the user. The credentials are collected from the alternate authentication environment and provided to the SSO resource in the form of a ticket. The SSO resource forwards the ticket to an SSO provider. The SSO provider identifies the user within a user store using the credentials in the ticket. If the SSO provider identifies the user, the SSO provider generates a token and provides the token to the SSO resource. The token is authenticated by the SSO resource and access is granted to the user.

20 Claims, 6 Drawing Sheets

(56) References Cited

U.S. PATENT DOCUMENTS

2014/0040638 A1* 2/2014 Barton .................... H04L 41/00
                                                713/193
2014/0337528 A1* 11/2014 Barton .................... H04L 41/00
                                                709/225

OTHER PUBLICATIONS

SAP, Inc., "Using Logon Tickets", http://help.sap.com/saphelp_nw74/helpdata/en/4d/a5ddc832211dcde10000000a42189c/content.htm, as visited on Apr. 21, 2015, 2 pages.

Wenbin, et al., "Lightweight Single Sign-On System Based on Plug-In Technology", In Proceedings of the 2010 International Conference on Information Security and Artificial Intelligence (ISAI 2010) . Chengdu, China., Dec. 17-19, 2010, 5 pages.

* cited by examiner

TICKET GENERATOR FOR ALTERNATE AUTHENTICATION ENVIRONMENTS

BACKGROUND

The disclosure generally relates to the field of computer systems, and more particularly to single sign-on and identity federation systems.

Single sign-on ("SSO") systems allow a user to access a variety of resources after entering logon credentials a single time. When a user tries to access a resource that is protected by the SSO system, the user is redirected to an SSO provider. The SSO provider provides an interface for the user to enter credentials. The SSO provider authenticates the user's credentials against a user store or database containing user identity information. The SSO provider then generates a token for the user. The token is stored on the user's system or is provided to the SSO resource. The SSO resource validates the token based on an established trust relationship between the resource and the SSO provider, and then grants access to the user. When the user attempts to access another SSO resource, the user does not reenter credentials; instead, the user's token is provided to gain access to the SSO resource.

SUMMARY

In distributed and federated systems, some resources may be protected in an SSO environment, and other resources may be protected in an alternate authentication environment. After a user logs in to an alternate authentication environment, the user will again be prompted for login credentials when attempting to access a resource protected in an SSO environment. To avoid additional login prompts, credentials authenticated by the alternate authentication environment can be used by the SSO environment to identify the user. The authenticated credentials are collected from the alternate authentication environment and provided to the SSO resource in the form of a ticket. The SSO resource forwards the ticket to an SSO provider. The SSO provider searches a user store using the credentials in the ticket. If the SSO provider identifies an account corresponding to the credentials, the SSO provider generates a token and provides the token to the SSO resource. The token is authenticated by the SSO resource and access is granted to the user.

This summary is a brief summary for the disclosure, and not a comprehensive summary. The purpose of this brief summary is to provide a compact explanation as a preview to the disclosure. This brief summary does not capture the entire disclosure or all aspects, and should not be used to limit claim scope.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to passing user credentials from an alternate authentication environment to an SSO-environment in illustrative examples. But aspects of this disclosure can be applied to passing credentials between two non-SSO environments. In other instances, well-known instruction instances, protocols, structures and techniques have not been shown in detail in order not to obfuscate the description.

Overview

In distributed and federated systems, resources, such as applications and data sources, may be protected by a variety of authentication schemes. Some resources may be protected in an SSO environment, and other resources may be protected in an alternate authentication environment. After a user logs in to an alternate authentication environment, the user will again be prompted for log in credentials when attempting to access a resource protected in an SSO environment, effectively eliminating the single log in prompt benefit of an SSO system. To avoid additional login prompts, credentials authenticated by the alternate authentication environment can be used by the SSO environment to identify the user. The authenticated credentials are collected from the alternate authentication environment and provided to the SSO resource in the form of a ticket. The SSO resource forwards the ticket to an SSO provider. The SSO provider searches a user store using the credentials in the ticket. If the SSO provider identifies an account or entry in the user store corresponding to the credentials, the SSO provider generates a token for the user and provides the token to the SSO resource. The token is authenticated by the SSO resource and access is granted to the user.

Terminology

This description refers to an SSO environment and an alternate authentication environment. The terms "SSO" and "alternate authentication" are used to distinguish environments with different authentication schemes. The terms are also used to distinguish resources or components within the two environments. The SSO environment includes an SSO authentication scheme with an SSO provider. The SSO environment also includes various SSO resources that are protected by the SSO authentication scheme such as applications, data sources, and web applications. The SSO resources may be located on a local network or may be accessible through the Internet. Similarly, the alternate authentication environment includes resources that are protected by an alternate authentication scheme. A user logged into an alternate authentication environment cannot access an SSO resource without entering additional credentials unless an alternate component, such as a ticket generator as described herein, is used to pass credentials from the alternate authentication environment to the SSO environment.

The terms "ticket" and "token" are used throughout the description to describe two different data objects. A ticket and a token may be similar in format and may contain similar information, such as a user's credentials. However, a ticket is a short-lived data object that is exchanged for a token and is not digitally signed by an SSO provider. Because the ticket is not signed, a ticket may not be used to access SSO resources. An SSO provider generates a token for a user. The token is signed by the SSO provider, so the token, unlike the ticket, can be authenticated by various SSO resources. Additionally, as mentioned above, a ticket is a short-lived data object while a token may be stored on a user's system and may persist for a longer lifetime. For example, a ticket may expire in seconds, while a token may not expire for hours. Furthermore, a ticket may be a lightweight ticket meaning that the ticket does not have a high level of security and is easier to implement in comparison to a higher security ticket or a token. For example, a lightweight ticket may be a hash table or a JavaScript Object Notation ("JSON") file.

The term "credential" is also used throughout this description. A credential is any piece of information or pieces of information that can be used to identify a user or account within a system. Examples of a credential or credentials include an email address, a username and password, residential address, employee identifier, etc.

The term "account" is also used throughout this description. An account refers to a set of user identity information and credentials. A user may establish an account by providing identity information and credentials to an authentication environment that then maintains the information. For example, an account may be an entry in an authentication environment's user store that includes a user ID, a password, and an email address for a particular user. If a user has an account with an environment, a user is considered to be known to that environment.

Example Illustrations

Figure 1:
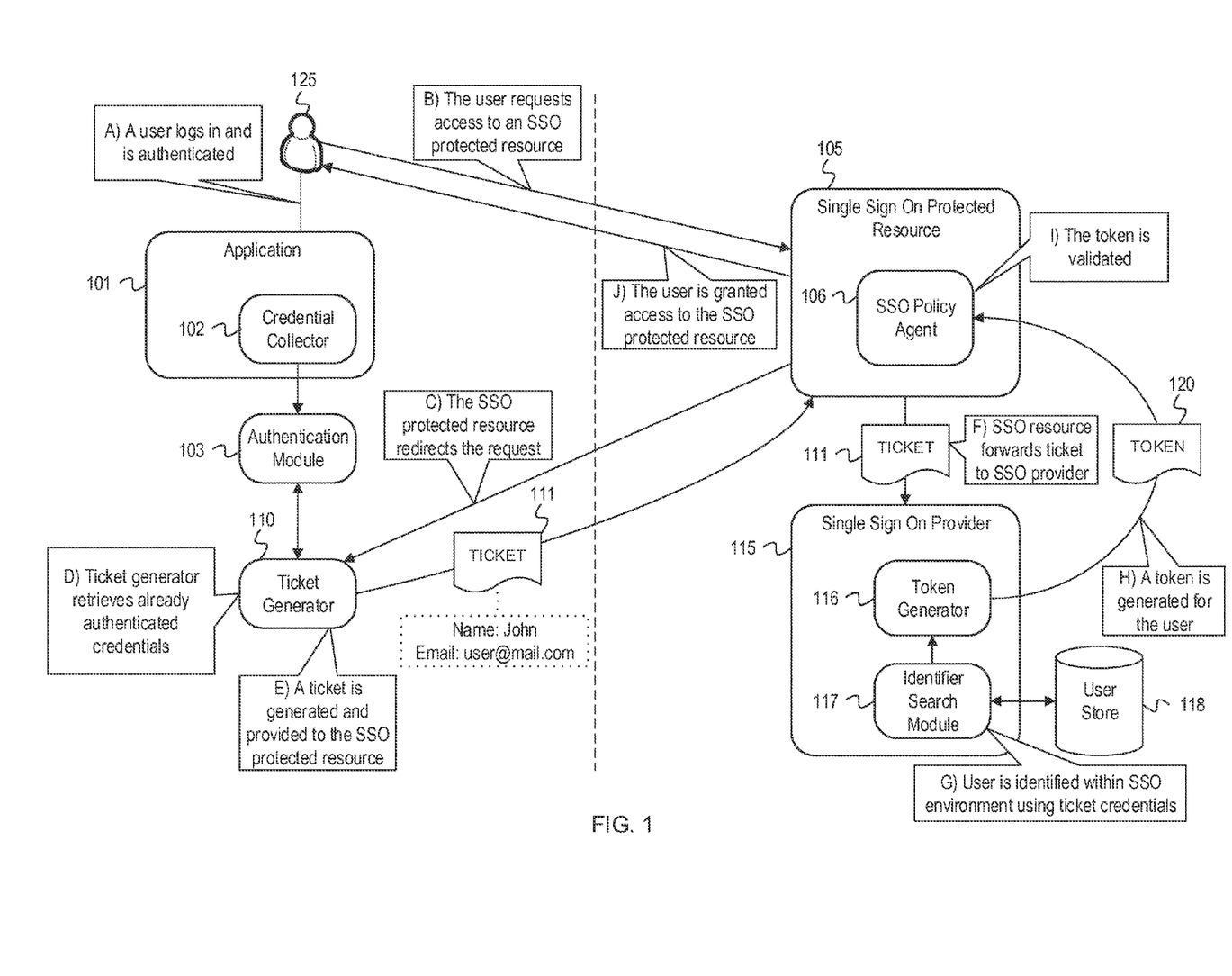
FIG. 1 depicts a conceptual diagram depicting an example system for generating tickets to identify users in an SSO environment.
Figure 2:
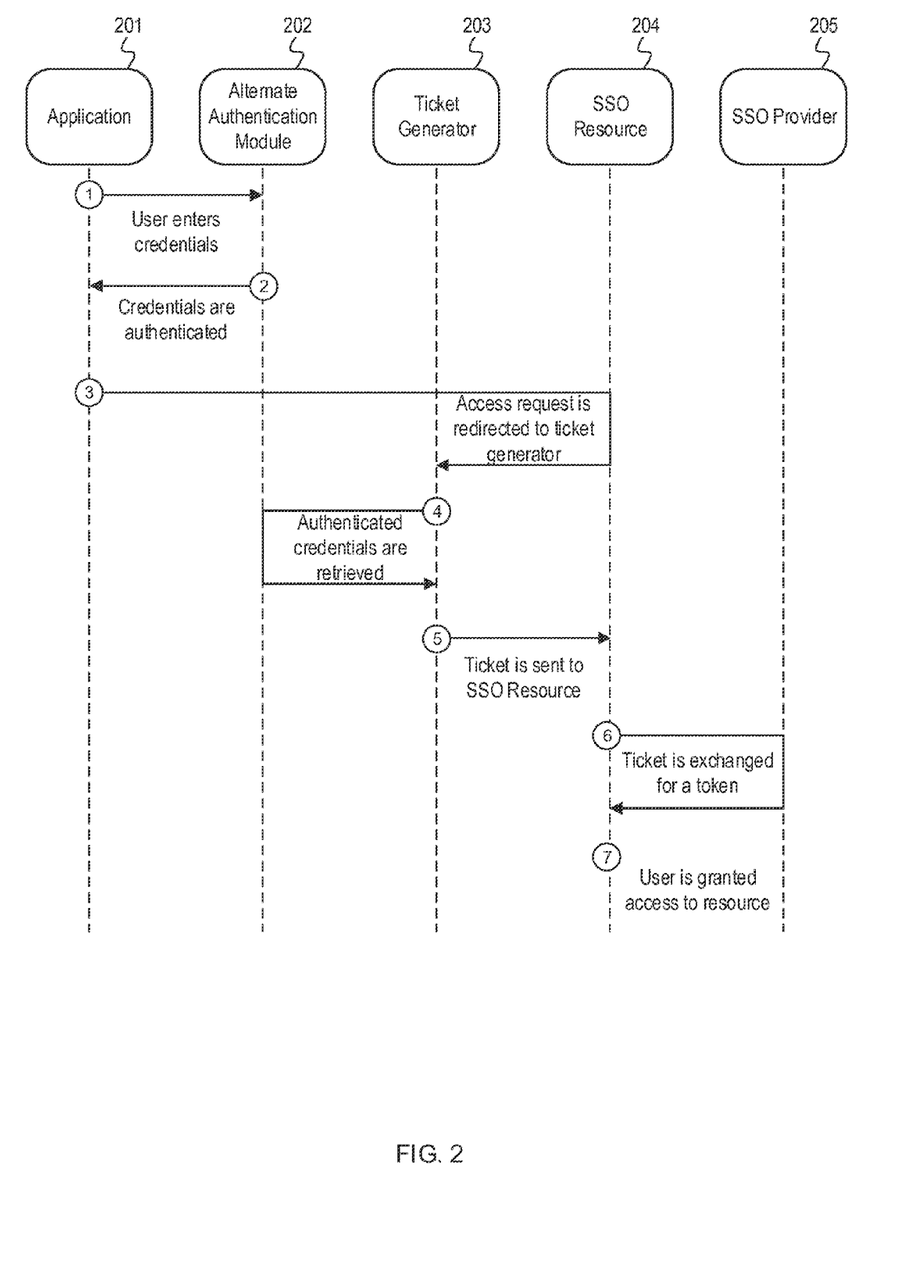
FIG. 2 depicts a timeline illustrating example stages 1-7 for gaining access to an SSO resource from an alternate authentication environment.

FIG. 1 is annotated with a series of letters A-J. FIG. 2 is annotated with a series of numbers 1-7. These letters and numbers represent stages of operations. Although these stages are ordered for this example, the stages illustrate one example to aid in understanding this disclosure and should not be used to limit the claims. Subject matter falling within the scope of the claims can vary with respect to the order and some of the operations.

FIG. 1 depicts a conceptual diagram depicting an example system for generating tickets to identify users in an SSO environment. FIG. 1 depicts within an alternate authentication environment an application 101, an authentication module 103, a ticket generator 110, and a user 125. The application 101 includes a credential collector 102. FIG. 1 depicts within an SSO environment a SSO protected resource 105 and an SSO provider 115. The SSO protected resource 105 includes an SSO policy agent 106. The SSO provider 115 includes a token generator 116 and an identifier search module 117, which communicates with a user store 118.

At stage A, the user 125 logs into the application 101. The application 101 may be any type of application, such as a desktop, mobile, or web application. The user's 125 credentials are collected by the credential collector 102 ("collector 102"). Although FIG. 1 depicts the user 125 entering credentials, credentials may be entered by another application, software module, etc. The collector 102 may be a user interface that allows a user to input credentials or the collector 102 may read credentials from a configuration file, a cookie, etc. The collector 102 passes the user's 125 credentials to the authentication module 103. The authentication module 103 authenticates the provided credentials and determines if the credentials are valid in accordance with an authentication scheme of the alternate authentication environment. The authentication scheme of the alternate authentication environment may be any known authentication scheme such as the Initiative for Open Authentication ("OATH"), OpenID, a Kerberos authentication scheme, Java Authentication and Authorization Service ("JAAS"), etc.

At stage B, the user 125 requests access to the SSO protected resource 105 ("SSO resource 105"). The SSO resource 105 is protected within the SSO environment. The SSO resource 105 may be an application, a web page, a data resource, a directory, etc. If the user 125 already has a token issued by the SSO provider 115, the user 125 may be granted access to the SSO resource 105. However, at stage B in FIG. 1, a token has not been generated for the user 125, and, as a result, the user 125 is not granted access to the SSO resource 105.

At stage C, the SSO resource 105 redirects the user's 125 request to the ticket generator 110. The SSO resource 105 redirects the user's 125 access request in order to retrieve credentials for the user 125 from the ticket generator 110. The SSO resource 105 is configured to redirect access requests from the user 125 to the ticket generator 110. Access requests from other users or applications may be redirected to ticket generators associated with the other user or applications or ticket generators associated with certain alternate authentication environments. Additionally, the SSO resource 105 may redirect the access request back to a system or application of the user 125, which subsequently may redirect to the ticket generator 110.

At stage D, in response to the request for credentials, the ticket generator 110 retrieves credentials for the user 125 from the authentication module 103. The credentials for the user were authenticated by the authentication module 103 at stage A. The ticket generator 110 is configured to retrieve credentials that may be used to identify the user within the SSO environment. For example, the authentication module 103 and the SSO provider 115 may both identify users using an email address. Depending on the configuration, the ticket generator 110 may retrieve some or all of the authenticated credentials. Additionally, the ticket generator 110 may retrieve other attributes stored in the authentication module 103 or a user store (not depicted) in the alternate authentication environment. For example, the ticket generator 110 may retrieve the user's 125 role, city, state, user ID etc. As depicted in FIG. 1 in a ticket 111, the ticket generator 110 retrieves the user's 125 name and email address.

At stage E, the ticket generator 110 generates the ticket 111 with the retrieved credentials and provides the ticket 111 to the SSO resource 105. The ticket 111 includes the credentials retrieved by the ticket generator 110, i.e. the user's 125 name and email address. The ticket 111 may also include an identifier for the alternate authentication environment or other identifier that can be used by the SSO provider 115 to identify the source of the ticket. The ticket 111 may be a data structure or file that includes the credentials such as a hash table, an associative array, a JSON file, etc. Additionally, the ticket 111 may be a file in a markup language format such as the Extensible Markup Language ("XML"), Security Assertion Markup Language ("SAML"), or variations thereof.

At stage F, the SSO resource 105 forwards the ticket 111 to the SSO provider 115. The SSO resource 105 provides the ticket 111 to the SSO provider 115 to exchange the ticket 111 for a token 120. The SSO resource 105 may also request additional attributes for the user from the SSO provider 115. For example, the SSO resource 105 may request a user's access level or role within the SSO environment. After the ticket 111 is provided to the SSO provider 115, the SSO resource 105 waits until the SSO provider 115 indicates that the user has been identified within the SSO environment.

At stage G, the identifier search module 117 ("search module 117") uses the ticket 111 to determine whether a user identified by the ticket 111 is known in the SSO environment. The search module 117 determines whether one or more of the credentials in the ticket 111 is in the user store 118. For example, the search module 117 may search the user store 118 for the user's 125 email address. The user store 118 contains identity information for users within the SSO environment. If the user's 125 credential is found within the user store 118, then it is determined that the user 125 identified by the ticket 111 has an account or is known to the SSO environment. After determining that the user 125 identified by the ticket 111 is known to the SSO environment, the search module 117 indicates to the token generator 116 that identity information corresponding to one or more credentials of the ticket 111 has been identified in the user store 118. The search module 117 may also pass additional information from the user store 118 to the token generator 116, such as additional attributes requested by the SSO resource 105.

At stage H, the token generator 116 generates the token 120 for the user 125. Tokens are used within an SSO environment to indicate that a user 125 has been authenticated and to provide user identity information, such as credentials and attributes, to SSO resources. By indicating that a user has been authenticated, tokens prevent the user from having to reenter credentials at each SSO resource. Additionally, the token 120 includes information that may be used by the SSO resource 105 to authenticate the token, such as a digital signature.

At stage I, the SSO policy agent 106 validates the token 120. The SSO policy agent 106 validates the token 120 to ensure the token is valid and originates from the SSO provider 115. The token 120 is digitally signed by the SSO provider 115, and the signature may be validated by the SSO policy agent 106. Additionally, user attributes in the token 120 may be used by the SSO policy agent 106. The SSO policy agent 106 may communicate with a policy server (not depicted) in the SSO environment to determine a policy for the SSO resource 105. SSO policies are used to set permissions for SSO resources. For example, a policy may dictate that an SSO resource may only be accessed by users with an administrator role or a certain access level. As part of the access process, the SSO policy agent 106 determines whether the user has permission or authorization to access the SSO resource 105.

At stage J, the user 125 is granted access to the SSO resource 105. The user 125 is granted access if at stage I the token 120 was successfully validated by the SSO policy agent 106 and the SSO policy agent 106 determined the user 125 is authorized to access the SSO resource 105. The SSO resource 105 may grant the user 125 access in a number of ways such as returning requested data or allowing access to a protected web page.

Various components depicted in FIG. 1 may be configured prior to use. For example, the ticket generator 110 may be configured to encrypt the ticket 111 using an encryption protocol. Similarly, the SSO provider 115 or the SSO policy agent 106 may be configured to decrypt the ticket 111 using the same encryption protocol. To facilitate the encryption and decryption, the ticket generator 110 may share a secret, encryption key, certificate, etc., or may otherwise establish a trust partnership with the SSO provider 115 or the SSO policy agent 106. The ticket 111 may be encrypted using any known technique or protocol. For example, the ticket 111 may be encrypted using a secret or key, and the encrypted data may be sent. Additionally, a secret may be prepended to the data of the ticket 111 before hashing the data. The hash of the data may then be sent along with the ticket 111 for data integrity. In both instances, the secret or key may be salted with a nonce value prior to use. Prior to exchanging the ticket 111 for the token 120, the SSO policy agent 106 or the SSO provider 115 may validate the ticket 111. Validating the ticket 111 may include determining whether the ticket 111 has expired, verifying that the ticket 111 was produced using the secret or encryption key, identifying a particular user attribute or credential in the ticket 111, verifying the hash of the ticket 111, etc.

In addition to the data described above, the ticket 111 may include other data such as a domain or identifier for the alternate authentication environment, a date and time the ticket was created, a version number, or a partnership identifier. The partnership identifier is an identifier that indicates to the SSO policy agent 106 or the SSO provider 115 which trusted partner generated the ticket 111 and which set of properties to use when validating the ticket 111. The set of properties to use for validation may include a secret or encryption key, a hash function, a certain user attribute to search for in the ticket, how long the ticket is valid, an algorithm to use when decrypting the ticket, etc. Additionally, the ticket 111 may include an optional field to enhance the security of the ticket 111. For example, the optional field may include a salt for the secret or encryption key of the ticket. The additional data described above may be included in a hash table or other data structure of the ticket 111.

Also, the SSO environment may contain a component that intercepts access requests from alternate authentication environments. The component may determine where the access request originated and redirect the request to a corresponding ticket generator. Alternatively, the component may determine that a token for the user has already been generated and forward the token along with the access request to an SSO resource.

FIG. 2 depicts a timeline illustrating example stages 1-7 for gaining access to an SSO resource from an alternate authentication environment. FIG. 2 depicts an application 201, an authentication module 202, a ticket generator 203, an SSO resource 204, and an SSO provider 205. The arrows associated with the stages 1-6 indicate the flow of data and/or control between each of the depicted components.

At stage 1, a user's credentials are entered in the application 201 and are passed to the authentication module 202. The application 201 is within an alternate authentication environment and may be a web application such as a web-based email client. The application 201 may include an interface to receive a user's credentials or may forward a user to another module in the alternate authentication environment to enter credentials. The user enters credentials sufficient for authentication, such as an email and a password.

At stage 2, the authentication module 202 authenticates the user's credentials. The authentication module 202 is within the alternate authentication environment and authenticates the credentials according to an authentication scheme for the alternate authentication environment. If the credentials are successfully authenticated, the authentication module 202 returns control to the application 201, and the user is granted access to the protected portions of the application 201. In the example of a web-based email client, a user gains access to emails.

At stage 3, the user requests access to the SSO resource 204. For example, if the application 201 is an email client, the user may click a link in an email that directs the user to an SSO protected web page, such as a company payroll page. The SSO resource 204 determines that the user does not have an SSO token and redirects the request to the ticket generator 203. The SSO resource 204 is configured to redirect requests to a ticket generator associated with the source of the request. For example, if the request is from company A, the SSO resource redirects to company A's ticket generator. The SSO resource 204 may determine the source of the request by analyzing the requested Universal Resource Locator ("URL"), the Internet Protocol ("IP") address of the requestor, or through a unique identifier for the requestor. For example, a user may request access to or attempt to navigate to a URL that is unique to Company A, e.g. CompanyA.payroll.com. The SSO resource 204 determines that the source of the request is Company A based on the fact that the user attempted to access a URL that is unique to and used by Company A employees. Alternatively, the SSO resource 204 may determine the source of the request using the IP address associated with the request. The SSO resource 204 may retrieve information previously received from the user of the IP address or may compare the IP address to entries in a table that associates identities with IP addresses. As an additional example, a unique identifier for the alternate authentication environment may be transmitted along with the request for access.

At stage 4, the ticket generator 203 retrieves authenticated credentials from the authentication module 202. The ticket generator 203 may retrieve some or all of a user's credentials. For example, after the user logged into the application 201 using an email address and a password, the ticket generator 203 may retrieve the email address credential and may not retrieve the password credential. The ticket generator 203 may have access to a credential store within the alternate authentication environment and may retrieve other credentials for a user to be included in a ticket from the credential store.

At stage 5, the ticket generator 203 generates a ticket and sends it to the SSO resource 204. The generated ticket contains the credentials collected from the authentication module 202 at stage 3. For example, if the user's email address was collected, then the ticket contains the user's email address. The email address is sent in the ticket to the SSO resource 204.

At stage 6, the SSO resource 204 exchanges the ticket for a token. The ticket, unlike a token, is not sufficient to authenticate a user within an SSO environment. However, a ticket may be used to identify an account or entry in a user store associated with a user known in the SSO environment. A token can then be generated for the identified account. In order to get a token, the SSO resource 204 forwards the ticket to the SSO provider 205. The SSO provider 205 uses the credentials contained in the ticket to determine whether an account or entry for the user exists in an SSO user store. For example, if the ticket contains an email address, the SSO provider will use the email address to identify an entry in the user store that corresponds to the email address. Because the user's credentials were authenticated by the authentication module 202, the SSO provider 205 does not authenticate the credentials again. The SSO provider 205 merely uses the credentials from the ticket to determine whether the user associated with the email address is known in the SSO environment. Once the SSO provider has identified an account or entry for the user in the SSO user store, the SSO provider generates a token and returns it to the SSO resource 204.

At stage 7, the SSO resource 204 grants the user access. The SSO resource 204 validates the token received from the SSO provider 205. The SSO resource 204 can authenticate the token because the token, unlike the ticket, is digitally signed by the SSO provider 205 and because there an established trust relationship between the SSO resource 204 and the SSO provider 205. The token may contain additional credentials for a user such as the user's SSO identifier ("ID") that may be used to determine permissions for the user. Once the token is authenticated, the SSO resource 204 grants the user access.

The user begins the stages described above by entering credentials into the application 201 at stage 1. Additionally, the user may initiate a request to access the SSO resource 204 at stage 3. To continue the example of an email client, the user, after logging into the client, may click a URL in an email that directs the user to the SSO resource 204. At this point, the stages 4-7 can occur without user interaction. If the user clicked a URL for a company payroll page, the user, assuming the user was successfully identified in the SSO environment, will be granted access to the company payroll page without further action, such as entering additional credentials.

Figure 3:
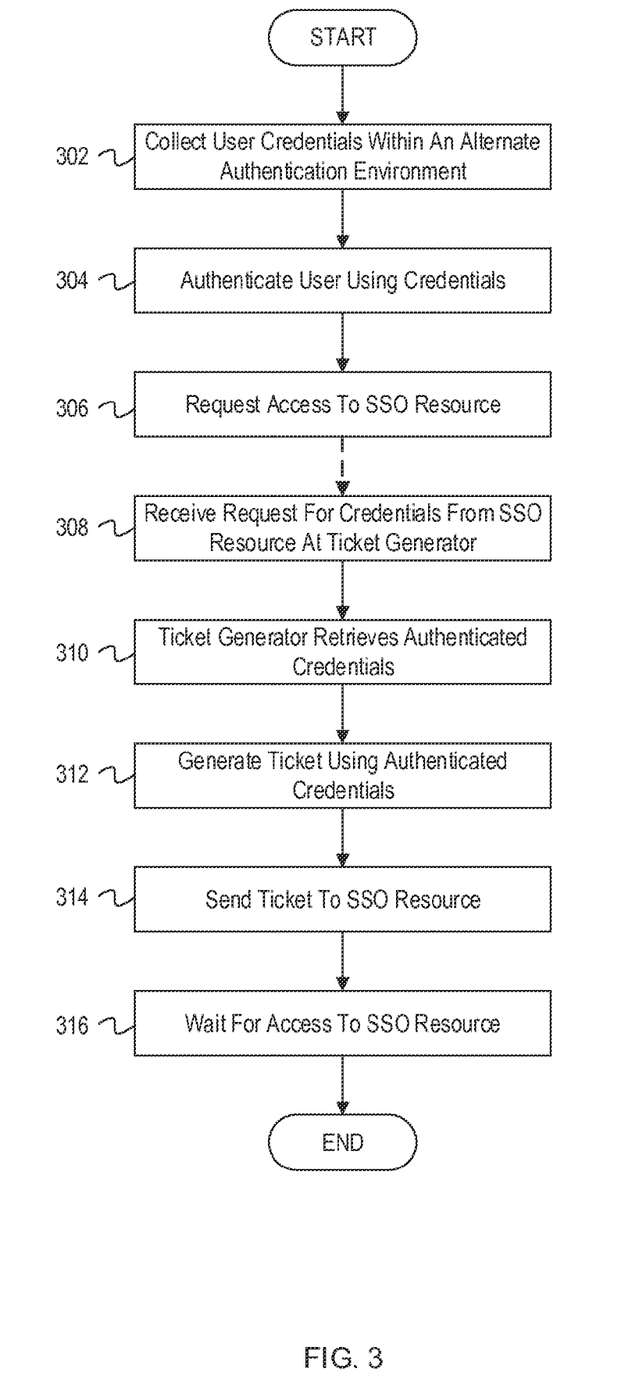
FIG. 3 depicts a flow diagram illustrating example operations for accessing an SSO resource from an alternate authentication environment.

FIG. 3 depicts a flow diagram illustrating example operations for accessing an SSO resource from an alternate authentication environment.

A credential collector collects user credentials within an alternate authentication environment (302). The credential collector can accept user credentials input via a user interface, read user credentials from a file, wirelessly receive user credentials from a device, receive credential from a security fob, etc. The types of credentials collected, user ID, email, password, etc., varies depending on the configuration of the alternate authentication environment.

An authentication module authenticates the user using the credentials (304). The credentials collected at process block 302 are authenticated according to an authentication scheme of the alternate authentication environment, such as OATH, OpenID, Kerberos, JAAS, etc.

The user requests access to an SSO resource (306). The user may request access by, for instance, causing an application to transmit a Hyper Text Transfer Protocol ("HTTP") message to the SSO resource. The user may cause the application to request access in accordance with different techniques. As examples, the application can perform a Remote Method Invocation, call an application programming interface function, etc. The request to access the SSO resource may be initiated by a user or by some function of the application. For example, the application may attempt to display data that is stored in an SSO protected data source, so the application may initiate the request. Additionally, a user may request access to a web page or application that is protected by the SSO environment. A dashed line from 306 to 308 indicates that the represented operations are asynchronous and non-linear.

A ticket generator receives a request for credentials from the SSO resource (308). Though a user has been authenticated within the alternate authentication environment, the user's identity has not been verified within the SSO environment. As a result, the SSO resource requests credentials before granting access to the user. In order to avoid having the user enter credentials again, the SSO resource directs the request to the ticket generator instead of the user. The request is received by the ticket generator within the alternate authentication environment.

The ticket generator retrieves authenticated credentials (310). The ticket generator retrieves credentials that are sufficient to identify a user's account within the SSO environment. In some implementations, a ticket generator may collect a single credential such as an email address. The email address may then be used by an SSO provider to identify an account for the user in an SSO user store. The number and type of credentials collected by the ticket generator is configured based on the authentication scheme of the SSO environment. For example, in some configurations where a single unique credential is not stored, two credentials may be used to successfully identify a user account and disambiguate the account. The credentials may be read or requested from an authentication module within the alternate authentication environment. Attributes may be read from an entry in an alternate authentication environment user store that corresponds to the authenticated credentials.

The ticket generator generates a ticket that includes the authenticated credentials (312). The ticket is a data structure or file format that can be read by an SSO provider. The type of data structure or file format is preconfigured. The ticket may be a data structure, possibly encrypted, such as a hash table for which the SSO provider knows the hash function or a file like a JSON file that may be read by the SSO provider. Additionally, the ticket generator may generate a ticket by formatting the credentials to be a SAML attribute statement, or the ticket generator may include encrypted ticket data as a SAML attribute. The SAML attribute statement may include other ticket data such as a partner identifier, a data and time stamp, etc. A SAML attribute statement, depicted with header information removed and with both unencrypted and encrypted data as an example, may be as follows:

```
<saml:AttributeStatement>
    <saml:Attribute FriendlyName="EMAIL"
        NameFormat="urn:oasis:names:tc:SAML:2.0:attrname
        format:unspecified">
        <saml:AttributeValue
            xmlns:xs=http://www.w3.org/2001/XMLSchema
            xmlns:xsi="http://www.w3.org/2001/XMLSchema-
            instance" xsi:type="xs:string">
            user@mail.com
        </saml:AttributeValue>
    </saml:Attribute>
    <saml:Attribute FriendlyName="NAME"
        NameFormat="urn:oasis:names:tc:SAML:2.0:attrname
        format:unspecified">
        <saml:AttributeValue
            xmlns:xs=http://www.w3.org/2001/XMLSchema
            xmlns:xsi="http://www.w3.org/2001/XMLSchema-
            instance" xsi:type="xs:string">
            John
        </saml:AttributeValue>
    </saml:Attribute>
    <saml:Attribute FriendlyName="EncryptedTicketData"
        NameFormat="urn:oasis:names:tc:SAML:2.0:attrname
        format:unspecified">
        <saml:AttributeValue
            xmlns:xs=http://www.w3.org/2001/XMLSchema
            xmlns:xsi="http://www.w3.org/2001/XMLSchema-
            instance" xsi:type="xs:string">
            partID:partner1;
            encrdata:1J3JD83JDU+9FJ3MDJF3IF9DKEM+
            3JKDFMJ3=;
        </saml:AttributeValue>
    </saml:Attribute>
</saml:AttributeStatement>
```

The ticket is sent to the SSO resource (314). The ticket generator responds to the SSO resource's request for credentials by sending the ticket to the SSO resource. The ticket may be sent using a communication protocol such as an HTTP or Simple Object Access Protocol ("SOAP").

After the ticket is sent, the user waits for access to the SSO resource (316). The user waits until the SSO resource responds indicating that access has been granted. For example, the user may wait until requested data is returned from the SSO resource. Or, in the case of a protected web page, the user may wait until the request to access the web page resolves and a user's web browser loads the web page.

The description above refers to a user requesting access and being granted access to an SSO resource; however, a request for access is in reality generated by an application such as a web browser. Although the user may cause the application to generate the request, an application sends the request and waits for access to the requested resource. The application may then display the resource to the user or otherwise perform operations with the requested resource.

Figure 4:
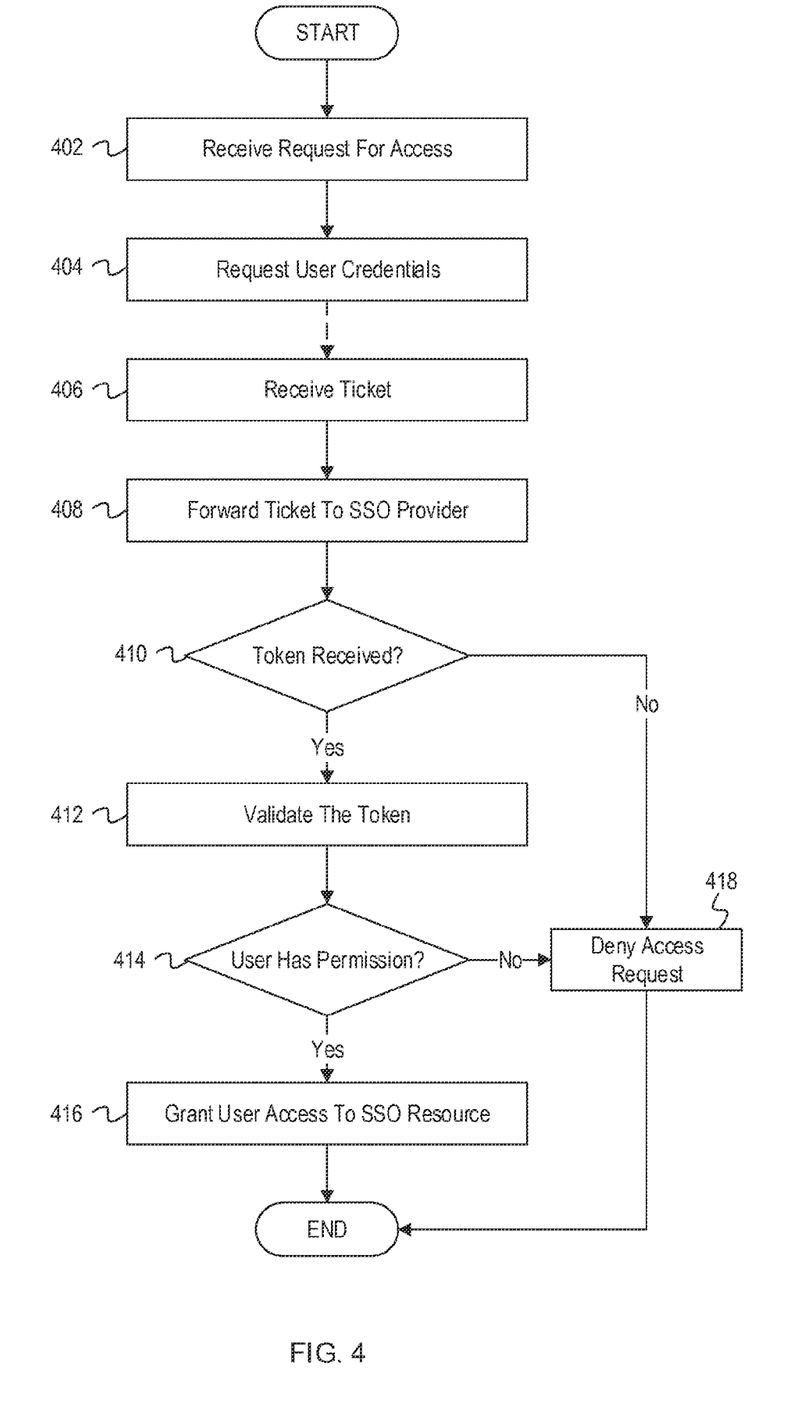
FIG. 4 depicts a flow diagram illustrating example operations for handling an access request at an SSO resource.

FIG. 4 depicts a flow diagram illustrating example operations for handling an access request at an SSO resource. FIG. 4 refers to an SSO resource as performing the example operations.

An SSO resource receives a request for access (402). The SSO resource may receive an HTTP message, a SOAP message, etc. The request for access may be for a particular web page, data source, etc. The SSO resource determines a source of the request. The source of the request affects where the SSO resource directs a request for user credentials (404). The source may be determined by identifying an IP address, a domain name, a URL, or an identifier associated with the source.

The SSO resource requests user credentials (404). The SSO resource requests user credentials from the alternate authentication environment. The request for credentials may be directed to the source of the request for access. Alternatively, the request for credentials may be forwarded to a destination associated with the source, such as a ticket generator. The destination associated with the source may be configured within the SSO environment, such as in a database that stores sources and associated destinations for credential requests. In some implementations, an alternate authentication environment may be configured to intercept requests for credentials and redirect the requests to a credential store. The SSO resource may request attributes in addition to user credentials. Attributes may include a user's birth date, location, time zone, computer operating system, or other information that may be pertinent to whether a user has permission to access the SSO resource. A dashed line from 404 to 406 indicates that the represented operations are asynchronous and non-linear.

The SSO resource receives a ticket (406). The ticket includes user credentials that were authenticated within the alternate authentication environment. The ticket may also include any attributes requested by the SSO resource. The SSO resource or an SSO policy agent may read the attributes from the ticket and store the attributes to be used later when determining user permissions. Additionally, upon receiving the ticket, the SSO resource, or an agent of the SSO resource, may validate the ticket. Validating the ticket may include verifying a secret or encryption key of the ticket.

The SSO resource forwards the ticket to an SSO provider (408). The ticket may be forwarded using a communication protocol such as an HTTP or SOAP. The SSO resource provides the ticket to an SSO provider to exchange the ticket for an SSO token. Once an SSO token has been generated for the user, the user may access resources within the SSO environment. The token is provided to each additional SSO resource to which the user requests access. In addition to forwarding the ticket, the SSO resource may request user attributes from the SSO provider. The attributes may include a user's role or authority level within the SSO environment.

The SSO resource determines whether a token was received (410). If a token was not received, the SSO resource denies the request for access received at process block 402 (418). The SSO resource may deny the request for access by indicating the denial to an application or user in the alternate authentication environment. After the request for access is denied, the process ends.

If a token was received, the SSO resource validates the token (412). The SSO resource validates the token to verify the token is valid and originated from the SSO provider. The token is validated in accordance with a trust relationship established between the SSO resource and SSO provider. For example, the token may be validated based on a shared secret or digital signature.

The SSO resource determines whether the user has permission to access the SSO resource (414). Even if a user has a validated SSO token, a user may not be authorized to access all SSO resources if a user lacks sufficient permissions. Each SSO resource may have an SSO policy agent that communicates with a central policy server to determine a user's permissions. The SSO policy agent determines if a user is authorized to access the SSO resource. The policy agent may determine a user's permissions based on attributes in the token, such as a user's role or authority level. Also, the policy agent may determine a user's permissions based on attributes received in the ticket, such as a user's age. In some implementations, the SSO system does not use policies, for instance when all user have the same permissions. In such an instance, the operations of process block 414 may not be performed. If the user does not have permission, the SSO resource denies the request for access received at process block 402 (418). After the request for access is denied, the process ends.

If the user has permission, the SSO resource grants access to the SSO resource (416). The SSO resource may grant a user access by returning a requested resource such as data or a web page. After the user is granted access to the resource, the process ends.

In instances where a user's request for access is denied (418), the SSO resource may request alternate credentials from the user. In such an instance, a user may again be asked to provide login credentials through an SSO portal or login interface.

Figure 5:
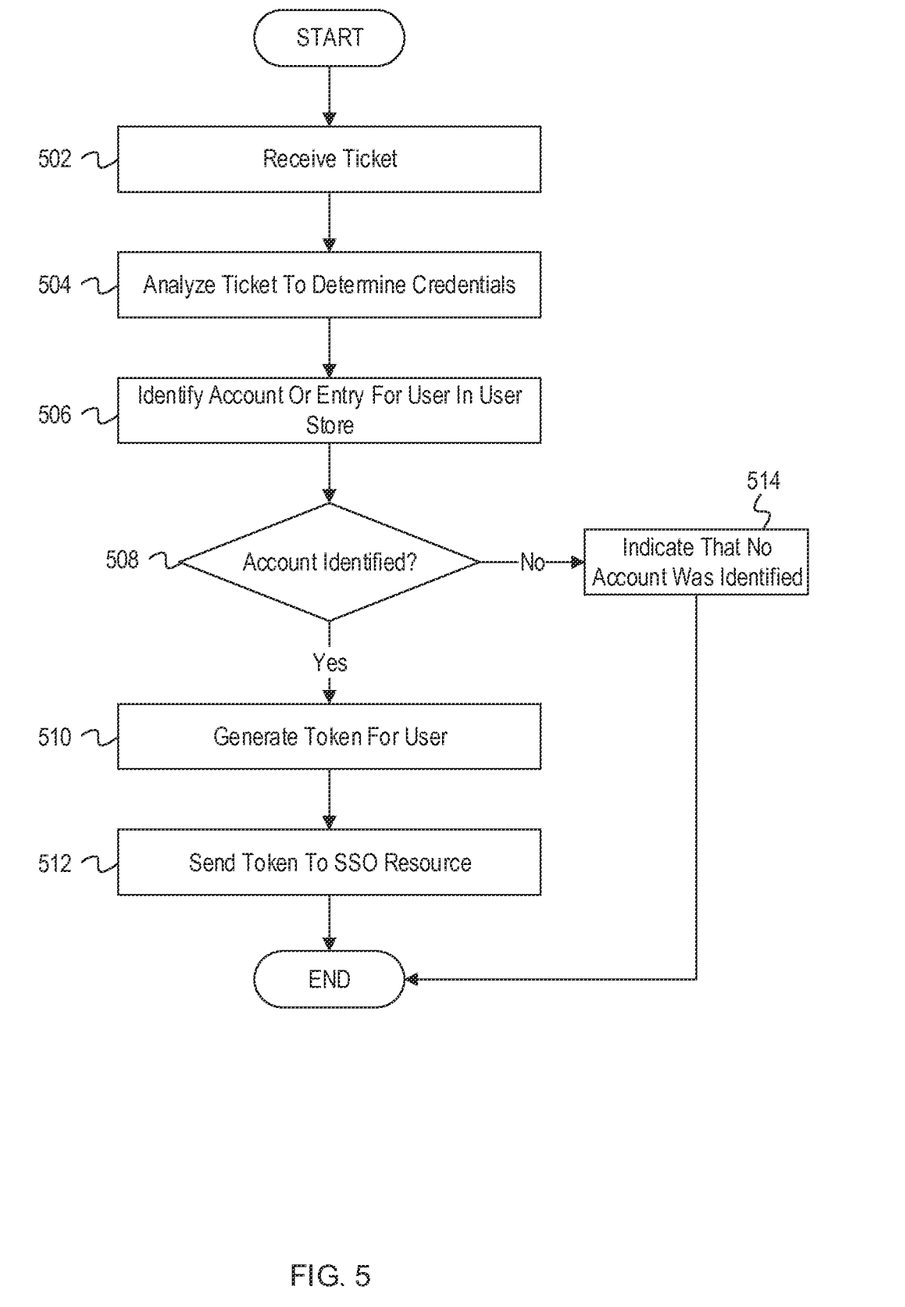
FIG. 5 depicts a flow diagram illustrating example operations for exchanging a ticket for an SSO token.

FIG. 5 depicts a flow diagram illustrating example operations for exchanging a ticket for an SSO token. FIG. 5 refers to an SSO provider as performing the example operations.

An SSO provider receives a ticket (502). The SSO provider receives from an SSO resource a ticket that was generated in an alternate authentication environment.

The SSO provider analyzes the ticket to determine credentials (504). The SSO provider reads some or all of the credentials from the ticket. If the ticket is encrypted, the SSO provider will decrypt the ticket before reading the credentials.

The SSO provider identifies an account or entry for the user in a user store (506). The user store includes identity information for users within the SSO environment. The SSO provider searches the user store using the credentials read from the ticket. In some instances, an account or entry for a user may be identified using a single credential. For example, a user's email address may be used as this credential may be unique for the user, i.e. no other user has the same email address. In instances where a single credential is not unique to a user, an additional credential may be used to further disambiguate user entries in the user store.

The SSO provider determines whether an account for the user was identified in the user store (508). If the SSO provider did not identify the user, the SSO provider indicates that no account associated with the user's credentials was identified (514). The SSO provider may indicate to the SSO resource that provided the ticket that an account for the user was not identified so that the SSO resource may deny a request for access.

If the SSO provider did identify an account for the user, the SSO provider generates a token for the user (510). The content of the token varies depending on the configuration of the SSO provider. The token may include a number of attributes for a user such as an email, user ID, role, or authority level. The token, unlike a ticket, is digitally signed by the SSO provider, which allows the token to be authenticated by SSO resources. The token may be in a format such as a SAML security assertion. In the example SAML assertion token below, the token is digitally signed using an X.509 Certificate and contains two attributes for the user, the user's name, John, and email, user@mail.com:

```
<saml:Assertion
    xmlns:saml="urn:oasis:names:tc:SAML:2.0:assertion"
    xmlns:xs="http://www.w3.org/2001/XMLSchema"
    xmlns:xsi="http://www.w3.org/2001/XMLSchema-instance"
    xmlns:ds="http://www.w3.org/2000/09/xmldsig#"
    ID="_33776a319493ad607b7ab3e689482e45"
    Version="2.0"
    IssueInstant="2015-06-01T20:31:41">
<ds:SignedInfo><ds:CanonicalizationMethod
Algorithm="http://www.w3.org/2001/10/xml-exc-c14n#"/>
<ds:SignatureMethod
Algorithm="http://www.w3.org/2000/09/xmldsig#rsa-sha1"/>
<ds:KeyInfo><ds:X509Data><ds:X509Certificate>MIICajCCAdOgAw
DA5zcC5leGFtcGxlLmNvbTAeFw0xNDA3MTcxNDEyNTZaFw0xNT
A3MTcxNDEyNTZaMFIxCzAJBgNVBAYTAnVzMRMwEQYDVQQID
ApDYWxpZm9ybmlhMRUwEwYDVQQKDAxPbmVsc2b2dpbiBJbmMMx
FzAVBgNVBAMMDnNwLmV4YW==</ds:X509Certificate>
</ds:X509Data></ds:KeyInfo></ds:Signature>
<saml:Subject>
    <saml:NameID
        Format="urn:oasis:names:tc:SAML:1.1:nameid-format:X509SubjectName">
        CN=user@mail.com,OU=User,O=NCSA-TEST,C=US
    </saml:NameID>
</saml:Subject>
<saml:Conditions
    NotBefore="2015-05-29T20:31:41"
    NotOnOrAfter="2015-06-01T20:21:41">
</saml:Conditions>
<saml:AuthnStatement
    AuthnInstant="2015-06-01T20:31:41">
    <saml:AuthnContext>
        <saml:AuthnContextClassRef>
            urn:oasis:names:tc:SAML:2.0:ac:classes:TLSClient
        </saml:AuthnContextClassRef>
    </saml:AuthnContext>
</saml:AuthnStatement>
<saml:AttributeStatement>
    <saml:Attribute
xmlns:x500="urn:oasis:names:tc:SAML:2.0:profiles:attribute:
X500" x500:Encoding="LDAP"
        NameFormat="urn:oasis:names:tc:SAML:2.0:attrname-format:uri"
        Name="urn:oid:2.5.4.42"
        FriendlyName="givenName">
        <saml:AttributeValue xsi:type="xs:string">
            John
        </saml:AttributeValue>
    </saml:Attribute>
    <saml:Attribute
xmlns:x500="urn:oasis:names:tc:SAML:2.0:profiles:attribute:
X500" x500:Encoding="LDAP"
        NameFormat="urn:oasis:names:tc:SAML:2.0:attrname-format:uri"
        Name="urn:oid:1.3.6.1.4.1.1466.115.121.1.26"
        FriendlyName="mail">
        <saml:AttributeValue xsi:type="xs:string">
            user@mail.com
        </saml:AttributeValue>
    </saml:Attribute>
</saml:AttributeStatement>
</saml:Assertion>
```

Once a token is generated, the token is sent to the SSO resource (512). The token indicates that the user is known or has an account within the SSO environment. Once the token is sent to the SSO resource, the process ends.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operation of determining user permissions depicted at block 414 of FIG. 4 may not be performed. Similarly, with respect to FIG. 1, an SSO policy agent may not be included in an SSO resource authentication module. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

The examples above describe interactions between an alternate authentication environment and an SSO environment. Embodiments are not limited to this case. In some cases, an SSO environment that utilizes a first authentication scheme may not be able to access a second SSO environment that utilizes a second authentication scheme. The first SSO environment can allow access to a protected resource by a user known in the second SSO environment if a ticket with a credential from the second SSO environment can be used to establish identity of the user in the first SSO environment.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
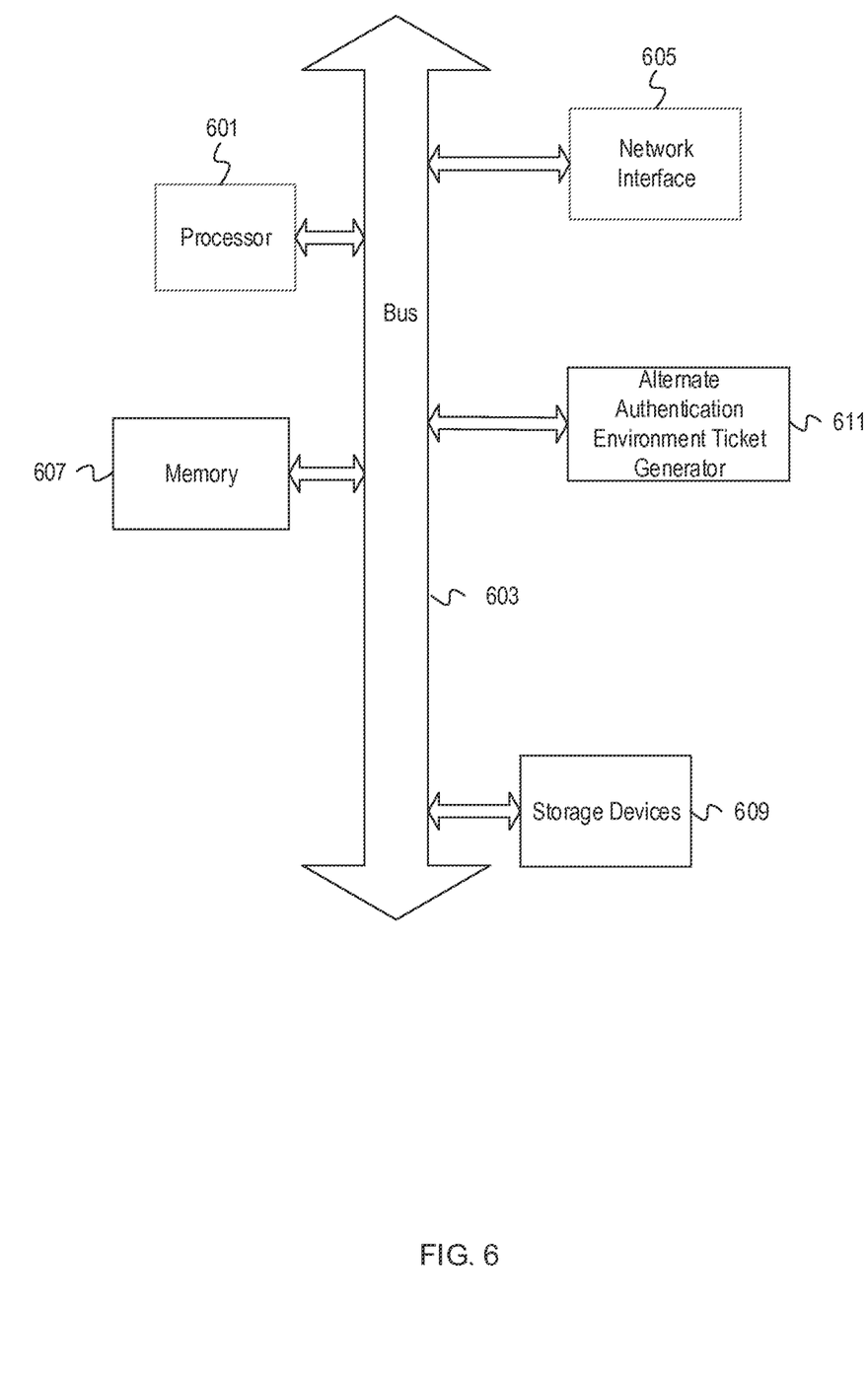
FIG. 6 depicts an example computer system with a ticket generator.

FIG. 6 depicts an example computer system with an alternate authentication environment ticket generator. The computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.). The system also includes the alternate authentication environment ticket generator 611. The alternate authentication environment generator 611 generates a ticket using authenticated credentials from an alternate authentication environment. The ticket is used to gain access to an SSO resource in an SSO environment. Any one of the previously described functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601 and the network interface 605 are coupled to the bus 603. Although illustrated as being coupled to the bus 603, the memory 607 may be coupled to the processor unit 601.

While the aspects of the disclosure are described with reference to various implementations and exploitations, it will be understood that these aspects are illustrative and that the scope of the claims is not limited to them. In general, techniques for granting a user access to an SSO resource as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method comprising:
   authenticating a first user account based, at least in part, on a first credential within a first authentication environment in accordance with a first authentication scheme;
   requesting access to a resource protected by a second authentication environment, wherein the second authentication environment uses a single sign-on authentication scheme, wherein a user associated with the first user account has not been authenticated within the second authentication environment;
   based on requesting access to the resource, within the first authentication environment:
      receiving, from the second authentication environment, a request for a first identifier;
      identifying the first identifier in an entry associated with the first user account in a first user store of the first authentication environment; and
      generating a first data object that comprises the first identifier;
   exchanging the first data object for a token within the second authentication environment, wherein the token allows for access to resources within the second authentication environment in accordance with the single sign-on authentication scheme, wherein exchanging the first data object for the token comprises:
      searching a second user store of the second authentication environment for a second user account associated with the first identifier; and
      based on determining that the second user store indicates the second user account associated with the first identifier, generating the token; and
   accessing the resource based, at least in part, on the first data object being successfully exchanged for the token.

2. The method of claim 1, wherein the first authentication scheme is different than the single sign-on authentication scheme; wherein the first authentication environment is configured as a trusted partner with the second authentication environment.

3. The method of claim 1, wherein exchanging the first data object for the token within the second authentication environment comprises sending the first data object to the second authentication environment.

4. The method of claim 1:
   wherein the first data object expires within a first time period;
   wherein the token expires within a second time period;
   wherein the first time period is shorter than the second time period; and
   wherein the token is encrypted in the second authentication environment.

5. The method of claim 1 further comprising allowing access to the resource protected by the second authentication environment after authentication of the token in the second authentication environment.

6. The method of claim 1 further comprising determining whether a permission associated with the second user account indicates permission to access the protected resource in the second authentication environment.

7. The method of claim 1 further comprising determining in the second authentication environment a second identifier for the first authentication environment.

8. The method of claim 1 further comprising configuring the second authentication environment to direct requests for the first identifier to a ticket generator associated with the first authentication environment, wherein the ticket generator is configured with permissions to access the first user store.

9. One or more non-transitory machine-readable media having program code stored therein, the program code to:
   authenticate a first user account based, at least in part, on a first credential within a first authentication environment in accordance with a first authentication scheme;
   request access to a resource protected by a second authentication environment, wherein the second authentication environment uses a single sign-on authentication scheme, wherein a user associated with the first user account has not been authenticated within the second authentication environment;
   based on the request for access to the resource, within the first authentication environment:
      receive, from the second authentication environment, a request for a first identifier;
      identify the first identifier in an entry associated with the first user account in a first user store of the first authentication environment;
      generate a first data object that comprises the first identifier; and
      send the first data object to the second authentication environment;
   exchange the first data object for a token, wherein the token allows for access to resources within the second authentication environment in accordance with the single sign-on authentication scheme, wherein the program code to exchange the first data object for the token comprises program code to, within the second authentication environment:
      search a second user store of the second authentication environment for a second user account associated with the first identifier; and
      based on a determination that the second user store indicates the second user account associated with the first identifier, generate the token; and
   allow access to the resource based, at least in part, on the first data object being successfully exchanged for the token.

10. An apparatus comprising:
a processor; and
a machine-readable medium having program code executable by the processor to cause the apparatus to,
  authenticate a first user account based, at least in part, on a first credential within a first authentication environment in accordance with a first authentication scheme;
  request access to a resource protected by a second authentication environment, wherein the second authentication environment uses a single sign-on authentication scheme, wherein a user associated with the first user account has not been authentication within the second authentication environment;
  based on the request for access to the resource, within the first authentication environment:
    receive, from the second authentication environment, a request for a first identifier;
    identify the first identifier in an entry associated with the first user account in a first user store of the first authentication environment; and
    generate a first data object that comprises the first identifier;
  exchange the first data object for a token, wherein the token allows for access to resources within the second authentication environment in accordance with the single sign-on authentication scheme, wherein the program code executable by the processor to cause the apparatus to exchange the first data object for the token comprises program code executable by the processor to cause the apparatus to, within the second authentication environment:
    search a second user store of the second authentication environment for a second user account associated with the first identifier; and
    based on a determination that the second user store indicates the second user account associated with the first identifier, generate the token; and
  allow access to the resource based, at least in part, on the first data object being successfully exchanged for the token.

11. The apparatus of claim 10, wherein the first authentication scheme is different than the single sign-on authentication scheme; wherein the first authentication environment is configured as a trusted partner with the second authentication environment.

12. The apparatus of claim 10, wherein the program code executable by the processor to cause the apparatus to exchange the first data object for the token in the second authentication environment comprises program code executable by the processor to cause the apparatus to send the first data object to the second authentication environment.

13. The apparatus of claim 10:
  wherein the first data object expires within a first time period;
  wherein the token expires within a second time period;
  wherein the first time period is shorter than the second time period; and
  wherein the token is encrypted in the second authentication environment.

14. The apparatus of claim 10 further comprising program code executable by the processor to cause the apparatus to allow access to the resource protected by the second authentication environment after authentication of the token in the second authentication environment.

15. The apparatus of claim 10 further comprising program code executable by the processor to cause the apparatus to determine whether a permission associated with the second user account indicates permission to access the protected resource in the second authentication environment.

16. The method of claim 1 further comprising:
  based on determining that two user accounts in the second user store indicate the first identifier, requesting a second identifier from the first authentication environment; and
  disambiguating the two user accounts based, at least in part, on the second identifier.

17. The method of claim 1, wherein the first identifier uniquely identifies a user associated with the first user account within the first user store and the second user account in the second user store, wherein the generated token includes a second credential retrieved from the second user store which identifies the second user account within the second authentication environment.

18. The apparatus of claim 10 further comprising program code executable by the processor to cause the apparatus to:
  based on a determination that two user accounts in the second user store indicate the first identifier, request a second identifier from the first authentication environment; and
  disambiguate the two user accounts based, at least in part, on the second identifier.

19. The apparatus of claim 10, wherein the first identifier uniquely identifies a user associated with the first user account within the first user store and the second user account in the second user store, wherein the generated token includes a second credential retrieved from the second user store which identifies the second user account within the second authentication environment.

20. The apparatus of claim 10 further comprising program code executable by the processor to cause the apparatus to configure the second authentication environment to direct requests for the first identifier to a ticket generator associated with the first authentication environment, wherein the ticket generator is configured with permissions to access the first user store.

* * * * *